United States Patent [19]
Takada et al.

[11] Patent Number: 5,151,637
[45] Date of Patent: Sep. 29, 1992

[54] DECELERATION APPARATUS FOR MOTOR AND DRIVE CIRCUIT FOR USE IN MOTOR DECELERATION APPARATUS OR CONTROL APPARATUS FOR USE IN SEWING MACHINE

[75] Inventors: Kazuaki Takada, Katsuta; Masayuki Kanari, Iwaki; Makoto Yajima; Eiji Toyoda, both of Hitachi, all of Japan

[73] Assignees: Hitachi, Ltd., Tokyo; Hitachi Taga Engineering Co., Ltd., Hitachi, both of Japan

[21] Appl. No.: 504,864

[22] Filed: Apr. 5, 1990

[30] Foreign Application Priority Data

Apr. 19, 1989 [JP] Japan .................... 1-97343

[51] Int. Cl.⁵ .............................. H02P 3/14
[52] U.S. Cl. .................... 318/376; 318/254; 318/380
[58] Field of Search ........... 318/362, 369, 375, 376, 318/138, 254, 439, 380

[56] References Cited

U.S. PATENT DOCUMENTS

| | | | |
|---|---|---|---|
| 3,947,740 | 3/1976 | Tsuboi | 318/376 |
| 3,969,661 | 7/1976 | Morinaga et al. | 318/268 |
| 4,401,926 | 8/1983 | Morton et al. | 318/376 |
| 4,423,363 | 12/1983 | Clark et al. | 318/375 |
| 4,732,099 | 3/1988 | Neki et al. | 318/369 X |
| 4,787,021 | 11/1988 | Hokari et al. | 318/376 X |
| 4,791,344 | 12/1988 | Yoshida et al. | 318/567 |

*Primary Examiner*—Bentsu Ro
*Attorney, Agent, or Firm*—Antonelli, Terry, Stout & Kraus

[57] ABSTRACT

A deceleration apparatus of an AC servo motor for use in an industrial sewing machine performs a regenerating braking operation during a motor deceleration period. At an early time in the regenerating braking operation of the motor, an intermittent regenerating braking operation is carried out by supplying a current in a control circuit of a motor drive circuit. Subsequently, a continuous regenerating braking operation in the motor is carried out. A drive element comprising a switching element or a transistor in the control circuit is protected in accordance with an intermittent regenerating braking operation or a small regenerating braking current.

16 Claims, 2 Drawing Sheets

DECELERATION APPARATUS FOR MOTOR AND DRIVE CIRCUIT FOR USE IN MOTOR DECELERATION APPARATUS OR CONTROL APPARATUS FOR USE IN SEWING MACHINE

BACKGROUND OF THE INVENTION

The present invention relates to a deceleration apparatus for a motor and a drive circuit for use in a motor deceleration apparatus or a control apparatus for use in a sewing machine, and more particularly to a deceleration apparatus for a motor and a drive circuit for use in a motor deceleration apparatus or a control apparatus for use in a sewing machine applicable to a general purpose use motor for operating a regenerative brake and applicable suitably to a deceleration apparatus of an alternating current (AC) servo motor for use in an industrial sewing machine.

In a conventional motor, for example in a motor for use in a sewing machine, an electromagnetic clutch braking type motor is employed. In this kind of electromagnetic clutch braking type motor, a time required for braking operation depends upon a mechanical friction braking operation and this braking time is a comparatively short one, and accordingly the motor can stop rapidly.

However, it requires many mechanical elements, and a friction face on a brake ring may wear easily and a life of the motor is apt to be a short one. Further, this kind of electromagnetic clutch braking type motor, has an undesirable manufacturing process and is expensive and further the motor has a large impact noise or mechanical shock noise.

For solving the above stated various defects, it has been known to employ a motor having an electric braking apparatus. Such a motor is disclosed, for example in Japanese Patent Publication No. 35267/1988, in which the motor has the electric braking apparatus. This electric braking apparatus in the motor is a drive control apparatus for use in a sewing machine in which the motor is controlled according to a negative-phase braking.

In the above stated drive control apparatus of the motor for use in the sewing machine, the negative-phase braking is carried out during the entire deceleration process, however there is paid no consideration about an electric load applied to a motor drive element for driving the motor.

When carrying out the electric control of the drive control apparatus for use in the sewing machine, it is necessary to absorb an electric energy or a rotation energy during the rotation of the motor a negative-phase or a regenerative power within a control circuit.

However, for absorbing this electric energy, it is necessary to supply a large electric current with the motor drive element for driving the motor. The motor drive element comprises generally switching elements and diodes.

In the conventional drive control apparatus of the motor for use in the sewing machine, since the large electric current is supplied to the motor drive element during all of the braking operation time or the deceleration operation period, accordingly the motor drive element for driving the motor is apt to be damaged. Further, in the drive control apparatus of the motor for use in the sewing machine having an electric current limiter which is provided for preventing a damage trouble in the motor drive element, it has a problem that it may invite an error during an operation of the electric current limiter.

The above stated undesirable tendencies become remarkable in the drive control apparatus of the motor for use in the apparatus for driving the load having a small friction torque and a large inertia. The industrial sewing machine belongs to an apparatus comprising the above stated load having the small friction and the large inertia.

SUMMARY OF THE INVENTION

An object of the present invention is to provide a deceleration apparatus of a motor and a drive circuit for use in a motor deceleration apparatus wherein a high reliability for a motor can be obtained.

Another object of the present invention is to provide a deceleration apparatus of a motor and a drive circuit for use in a motor deceleration apparatus wherein a long life for a motor can be obtained.

A further object of the present invention is to provide a deceleration apparatus of a motor and a drive circuit for use in a motor deceleration apparatus wherein destruction of a motor drive element in a control circuit can be prevented even when the motor deceleration apparatus performs an electric braking operation.

A further object of the present invention is to provide a deceleration apparatus of a motor and a drive circuit for use in a motor deceleration apparatus wherein an error operation in a motor control circuit can be prevented even, when the motor deceleration apparatus performs an electric braking operation.

A further object of the present invention is to provide a control apparatus for use in a sewing machine wherein a high reliability for a motor which is driven by an improved motor control apparatus can be obtained.

A further object of the present invention is to provide a control apparatus for use in a sewing machine wherein a long life for a motor which is driven by an improved motor control apparatus can be obtained.

A further object of the present invention is to provide a control apparatus for use in a sewing machine wherein destruction of a motor drive element in a motor control circuit of the sewing machine can be prevented even when the sewing machine performs an electric braking operation.

A further object of the present invention is to provide a control apparatus for use in a sewing machine wherein an error in a motor control circuit of the sewing machine can be prevented even when the sewing machine performs an electric braking operation.

In accordance with the present invention, a deceleration apparatus for a motor has a motor, a drive circuit for driving the motor, a rotation number (speed) control circuit for rotating the motor at a commanded and predetermined rotation number, and an operation command circuit for adding an operation command to the rotation number control circuit, the motor carries out a regenerating braking operation during a braking operation of the motor.

The rotation number control circuit of the drive circuit includes an element, and when the motor is subjected to the braking operation during an early time in a braking operation the element carries out an intermittent regenerating braking operation and when the motor attains a predetermined standard rotation number the element carries out a continuous regenerating braking operation.

At an early time in the regenerating braking operation a regenerating electric current is made small, and next the regenerating electric current is made large.

In accordance with the present invention, a drive circuit for use in a motor deceleration apparatus in which a drive circuit drives a motor and includes an inverter circuit, and a drive operation and a deceleration operation for the motor are added to the inverter circuit of the motor drive circuit, the motor drive circuit receives a rotation number command signal from outside and an encoder signal as a source signal for detecting a rotation number or the motor.

An intermittently regenerating braking signal is added to the inverter circuit until the rotation number of the motor attains a predetermined standard rotation number from a start of a deceleration, and after the rotation number of the motor becomes lower than the predetermined standard rotation number a continuous regenerating braking signal is added to the inverter circuit.

In accordance with the present invention, a drive circuit for use in a motor deceleration apparatus has a motor, a motor drive circuit for driving the motor, a rotation number control circuit for rotating the motor at a commanded and predetermined rotation number, and an operation command circuit for adding an operation command to the rotation number control circuit, the motor carries out a regenerating braking operation during a braking operation of the motor.

The rotation number control circuit detects a regenerating electric current in accordance with a braking command from the operation command circuit, when the regenerating electric current of the rotation number control circuit carries out an intermittent regenerating braking operation, and when the regenerating electric current of the rotation number control circuit is smaller than a predetermined standard electric current the rotation number control circuit carries out a continuous regenerating braking operation.

In accordance with the present invention, a control apparatus for use in a sewing machine has a motor for driving a sewing machine, a rotation number control circuit for driving the sewing machine drive motor, and a sequence control circuit for adding a predetermined operation instruction electric signal to the rotation number control circuit in accordance with a commanded electric signal which is commanded by a pedal of the sewing machine, the sequence control circuit receives the predetermined operation instruction electric signal and an up position electric signal and a down position electric signal of a needle of the sewing machine, and the rotation number control circuit takes-in two kinds of phase electric signals, a magnet position electric signal and a rotation number command electric signal.

During an early time in a braking operation according to a braking command electric signal by the pedal of the sewing machine, the rotation number control circuit carries out an intermittent regenerating braking operation for the sewing machine, and next the rotation number control circuit adds an electric signal for carrying out a continuous regenerating braking operation for the sewing machine to the rotation number control circuit.

During the early time of the braking operation in the motor, a large regenerating electric current is supplied generally to the control circuit in the motor drive circuit. However, according to the present invention, during the early time of the braking operation, the intermittent braking electric current or a small regenerating electric current is supplied to the control circuit in the motor drive circuit, so that the circuit element or the motor drive element in the motor drive circuit can be protected.

Further, according to the present invention, the time required for the braking operation for the sewing machine can be shortened in comparison with all the time supply of the intermittent electric current.

DESCRIPTION OF THE INVENTION

One embodiment of a deceleration apparatus for a motor and a drive circuit for use in a motor deceleration apparatus or a control apparatus for use in a sewing machine according to the present invention will be explained in detail referring to the drawings.

The present invention has wide application in the motor field and concerns a general purpose use motor. However, for the sake of convenience, one embodiment of the present invention will be explained with one example applicable to an industrial sewing machine field.

An alternating current (AC) servo motor, which is applicable to one embodiment of the present invention, comprises a rotor and a stator. The rotor has a permanent magnet, and the stator has a three-phase driving winding. The motor has an electric current supply system in accordance with an electric signal from a magnet pole detection element. The magnet pole detection element detects a position of the permanent magnet of the rotor in the motor.

Further, for detecting a rotation number of the motor, a magnetic encoder or an optical encoder is mounted at a motor shaft end of the rotor in the motor. Such a rotation number of the motor is detected in accordance with an electric signal which is obtained by the encoder.

The encoder outputs two kinds of phase signals comprising a leading-phase signal ($\Phi_A$) and a lagging-phase signal ($\Phi_B$). The leading-phase signal ($\Phi_A$) and the lagging-phase signal ($\Phi_B$) outputted from the encoder have a phase difference of 90° in the electric signal (an electric angle) relative to each other. A rotation direction of the motor is detected in accordance with the leading or the lagging of these two kinds phase signals.

Generally in the industrial sewing machine field, the AC servo motor is constituted so as to transmit from a drive force from the motor shaft side to a shaft of the sewing machine motor side by rotating a belt. The sewing machine motor shaft is an inlet shaft for the power in the sewing machine. The transmission ratio is determined by a ratio between a pulley mounted on the motor shaft and a pulley mounted on the sewing machine motor shaft.

When there is no slip between the two pulleys and the belt, it is possible to detect the rotation number of the sewing machine motor through the rotation number of the motor.

Besides, a needle position detector for detecting an up position and a down position of the needle in the sewing machine is provided on the sewing machine motor. The needle is stopped selectively at the up position and the down position according to the contents of the sewing work and further in accordance with an electric detection signal which is obtained by the needle position detector.

Further, the needle position detector can detect the rotation number of the sewing machine motor. The needle position detector is called and is commonly known as a synchronizer.

Next, one embodiment of a control apparatus for use in an industrial sewing machine according to the present invention will be explained referring to FIG. 1.

Figure 1:
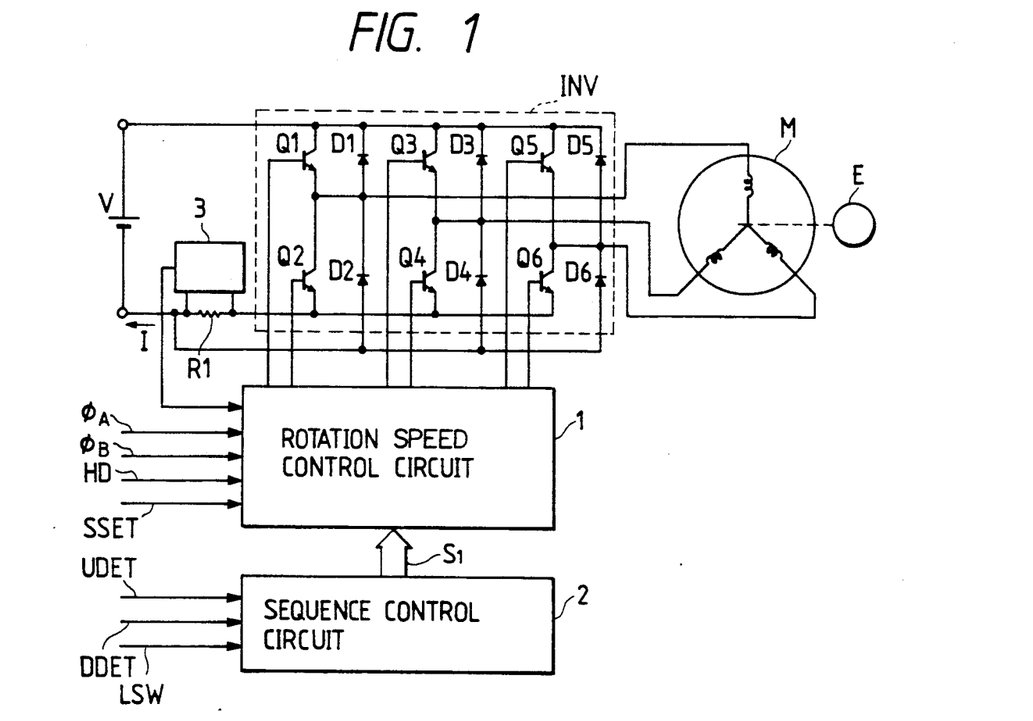
FIG. 1 is an electric control circuit for use in an industrial sewing machine showing one embodiment of a deceleration apparatus for a motor and a drive circuit for use in a motor deceleration apparatus or a control apparatus for use in an industrial sewing machine according to the present invention.

In FIG. 1, the control apparatus for use in the industrial sewing machine comprises mainly a rotation number electric control circuit 1, a sequence electric control circuit 2, an electric current detection circuit 3, an inverter circuit (INV), a brushless motor M and an encoder E. In the rotation number control circuit 1, various kind of electric signals such as an encoder leading-phase signal ($\Phi_A$), an encoder lagging-phase signal ($\Phi_B$), a magnet pole detection signal (HD) and a rotation number indication signal (SSET) are inputted.

The leading electric signal ($\Phi_A$) for the encoder E and the lagging electric signal ($\Phi_B$) for the encoder, E have a phase difference in the electric angle of 90° ($\lambda/4$ in terms of a signal wave length $\lambda$) relative to each other.

A magnet pole detection element of the rotor in the brushless motor M for detecting the magnet pole detection signal (HD) is mounted on a frame of the brushless motor M or a printed circuit board (not shown) etc.. The magnet pole detection element of the rotor in the brushless motor M comprises a Hall element or a magnetic resistance effect element, etc..

The rotation number indication signal (SSET) is obtained by the magnet pole detection element of the rotor. The rotation number indication detection signal (SSET) is a rotation number indication signal for indicating a rotation number of the sewing machine motor shaft.

The sequence control circuit 2 starts the brushless motor M and also stops the brushless motor M at a predetermined position. In this sequence control circuit 2, the various kinds of electric signals such as an up position electric signal (UDET) for the needle, a down position electric signal (DDET) for the needle and an operation command electric signal (LSW) for the brushless motor M are inputted.

The operation command electric signal (LSW) instructs the start and the stop of the brushless motor M and is inputted in the sequence control circuit 2 in conjunction with the up position electric signal (UDET) of the needle and the down position electric signal (DDET) of the needle.

The inverter circuit (INV) drives the brushless motor M. The brushless motor M comprises the encoder E. As shown in FIG. 1, the brushless motor M has a three-phase driving winding. and the inverter circuit (INV) is constituted by a three-phase inverter.

The inverter circuit (INV) comprises drivers having three upper arms comprising switching elements $Q_1$, $Q_3$, $Q_5$ and three lower arms comprising switching elements $Q_2$, $Q_4$, $Q_6$. The inverter circuit (INV) comprises the switching elements $Q_1$-$Q_6$ and diodes $D_1$-$D_6$.

Each of the switching elements $Q_1$-$Q_6$ comprises a transistor or a semiconductor element, respectively. Each of the diodes $D_1$-$D_6$ comprises a return current diode for protecting each of the switching elements $Q_1$-$C_6$, respectively.

A load electric current detection element $R_1$ is connected between an electric power source V and the inverter circuit (INV) and comprises commonly a fixed resistor. The electric power source V is a direct current (DC) source or a direct current (DC) source converted from an alternating current (AC) source.

An electric voltage drop between both sides of the load electric current detection element $R_1$ is detected in accordance with the electric current detection circuit 3, so that a load electric current of the brushless motor M or an electric current supplied to the brushless motor M depending on the size of the load can be detected.

Next, the operation according to the above stated various control circuits for use in the industrial sewing machine will be explained.

For example, in the industrial sewing machine being controlled by a pedal, the operation (rotation) command electric signal (LSW) is given to the sequence control circuit 2 in accordance with a step-in operation of the pedal of the sewing machine. The sequence control circuit 2 provides an operation instruction electric signal $S_1$ to the rotation number control circuit 1.

The rotation number control circuit 1 receives the operation instruction electric signal $S_1$ and controls the brushless motor M, such that the brushless motor M is rotated in accordance with a desired rotation number which is instructed by the rotation number instruction electric signal (SSET). The rotation number instruction electric signal (SSET) is given in accordance with a step-in angle of the pedal.

In other words, a rotation number (speed) and rotation direction in the brushless motor M are calculated in accordance with two-phase electric signal of the brushless motor M. A selection and a duty conducting element of each of the switching elements $Q_1$-$Q_6$ in the inverter circuit (INV) are decided in accordance with this calculated result.

The duty is controlled commonly in accordance with a pulse width modulation (PWM) control and is decided in accordance with a difference between a commanded speed and an actual speed.

Further, by the selection of the duty conducting element, an electric current can be supplied to one of the windings of the brushless motor M, and this selection of the duty conducting element is carried out in accordance with the magnet pole detection electric signal (HD).

At a rotation initial period in the brushless motor M, since a speed difference between the commanded speed and the actual speed is large commonly, the starting time is made short. The more the actual speed approaches the commanded speed, the more the duty is made small, accordingly it can be operated gradually with the commanded speed so as not to cause hunting.

As stated above, the brushless motor M can operate, and a load current I supplied to the brushless motor M is detected by the load current detection element $R_1$ and the current detection circuit 3.

When a current value detected by the current detection circuit 3 becomes over a predetermined set value, the rotation number control circuit 1 receives this signal and puts on the switching elements $Q_1$-$Q_6$ in the internal circuit (INV). The rotation number control circuit 1 cuts off also a current supply to the brushless motor M and prevents the destruction of the switching elements (semiconductor) $Q_1$-$Q_6$ in the inverter circuit (INV).

After a lapse of a predetermined period, the brushless motor M re-starts, and when the load current I is lower than a predetermined value, the rotation number control circuit 1 conducts the switching elements $Q_1$-$Q_6$ in the inverter circuit (INV) at a predetermined duty and makes to rotate the brushless motor M with at a predetermined rotation number.

After the brushless motor M reaches the rotation number which is instructed by the rotation number instruction electric signal (SSET), when the operation instruction electric signal (LSW) puts on, the sequence control circuit 2 outputs to the rotation number control circuit 1 so as to stop the needle of the sewing machine at the up position or the down position according to the up position signal (UDET) or the down position signal (DDET), respectively.

In this time, the rotation number control circuit 1 carries out a regenerating braking operation for the brushless motor M so as to stop rapidly the needle of the sewing machine at the up position or the down position.

Namely, the switching elements $Q_2$, $Q_4$ and $Q_6$ in the inverter circuit (INV) are turned on, and the regenerating electric power or the electric energy, which is generated during the deceleration operation of the brushless motor M, may be absorbed in the load current detection element $R_1$, which is connected commonly to the emitters of the switching elements $Q_2$, $Q_4$ and $Q_6$ in the inverter circuit (INV), and in a closed-loop circuit through the diodes $D_2$, $D_4$ and $D_6$ in the inverter circuit (INV).

However, it is impossible to absorb all of the regenerating electric power only in this close-loop circuit. Namely, the electric power exceeding the electric power source voltage V is returned to the electric power source through the diodes $D_1$, $D_3$ and $D_5$ in the inverter circuit (INV).

If the regenerating braking operation condition, in which a large electric current is supplied, is continued for a long period, it may cause destruction of the motor drive elements comprising the switching elements $Q_1$-$Q_6$. Therefore, the aim of the present invention is that at a high zone in which the rotation number of the brushless motor M exceeds a predetermined rotation number, the regenerating braking operation is carried out intermittently.

In general the highest speed of the sewing machine motor shaft of the industrial sewing machine is about 5000 (rpm), and the pulley ratio between the pulley mounted on the sewing machine motor shaft and the pulley mounted on the motor shaft is about 3:4. Specifically, since a pulley diameter of the sewing machine motor shaft is about 75 (mm) and a pulley diameter of the motor shaft is about 110 (mm), the speed of the brushless motor M becomes about 3400 (rpm) when the sewing machine motor rotates at the highest speed of about 5000 (rpm).

When a standard speed for carrying out intermittently the above stated regenerating braking operation is about 3000 (rpm), then the rotation number of the sewing machine motor shaft becomes about 4000 (rpm).

This standard rotation number may be a standard under the rotation number of the sewing machine motor shaft or under the rotation number of the motor shaft.

In a case that the inertia is large and a long time is required for the deceleration operation, the standard rotation number is set a high rotation number. Besides, in a case that the inertia is small and a short time is required for the deceleration operation, the standard rotation number is set the low rotation number. The above stated set method is suitable to for protecting the motor drive elements in the inverter circuit (INV).

Further, the intermittent frequency, which is given to each of the switching elements $Q_1$-$Q_6$ in the inverter circuit (INV), is suitably to several Kz, for example 2-3 Kz, in the case of each of the switching elements comprising a transistor.

Figure 2:
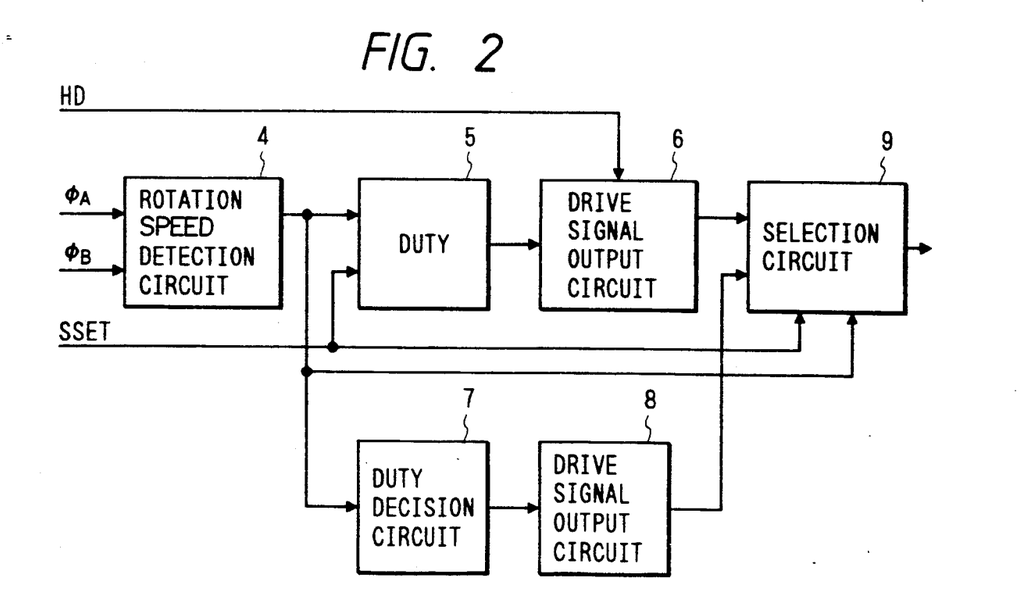
FIG. 2 is an electric block diagram showing one embodiment of a rotation number electric control circuit for use in an industrial sewing machine according to the present invention.

FIG. 2 is a detailed electric block diagram of the rotation number control circuit 1 for use in the industrial sewing machine shown in FIG. 1.

In FIG. 2, the rotation number electric control circuit 1 comprises a rotation number detection circuit 4, a duty calculation circuit 5 relating to PWM in an ordinary rotation zone, a drive signal output circuit 6 for the switching elements $Q_1$-$Q_6$ in the ordinary rotation zone, a duty decision circuit 7 during the regenerating braking operation, a drive signal output circuit 8 for the switching elements $Q_1$-$Q_6$, and a selection circuit 9 for changing to the intermittent regenerating braking operation or the continuous regenerating braking operation in response to the standard rotation number (standard speed).

Next, the operation of the rotation number control utilizing the above stated rotation number control circuit 1 for use in the industrial sewing machine will be explained.

The rotation number detection circuit 4 detects an actual rotation number (actual speed) of the brushless motor M in accordance with two kinds of the phase electric signals ΦA and ΦB outputted from the encoder E.

In accordance with both of a rotation number detection value, which is obtained by the rotation number detection circuit 4, and the rotation number instruction electric signal (SSET), which is given from the outside portion, the duty calculation circuit 5 requests the duty for giving the inverter circuit (INV) by the calculation. This calculated value of the duty is given to the inverter circuit (INV) as a drive signal via the drive signal output circuit 6 and the selection circuit 9.

In the other hand, during the braking operation of the brushless motor M, the duty decision circuit 7 determines whether the regenerating braking operation is to be intermittent or continuous to continue in accordance with the rotation number detection electric signal which is obtained by the rotation number detection circuit 4. Further, the duty decision circuit 7 gives the decided electric signal to the selection circuit 9 via the drive signal output circuit 8.

In accordance with the actual rotation number (actual speed) of the brushless motor M, which is obtained by the rotation number detection circuit 4, and the rotation number instruction electric signal (SSET), the selection circuit 9 determines whether the rotation control is the ordinary operation or the regenerating braking control. Further, the selection circuit 9 selects one of the drive signal output circuit 6 and the drive signal output circuit 8.

Figure 3:
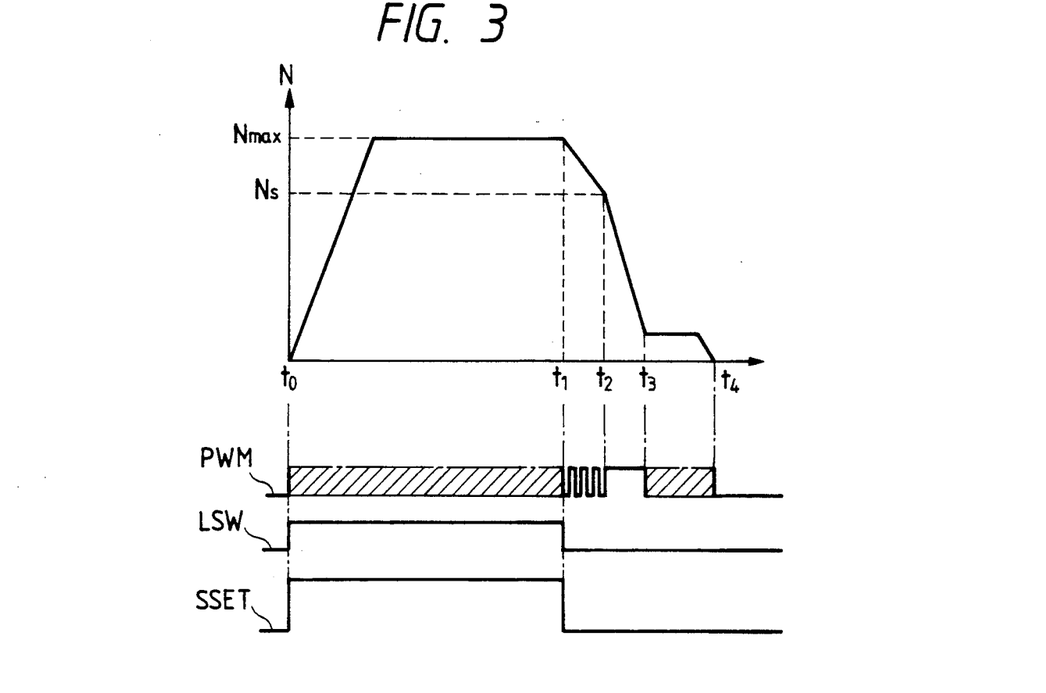
FIG. 3 is an explanatory view showing one embodiment of a relationship between a speed in an industrial sewing machine and a braking current for use in an industrial sewing machine according to the present invention.

FIG. 3 is a timing chart showing an actual rotation number (actual speed) control condition in the industrial sewing machine. In FIG. 3, N denotes the rotation number of the sewing machine motor shaft or the rotation number of the brushless motor M, $N_{max}$ denotes the maximum rotation number, and Ns denotes the standard rotation number. Symbols $t_0$, $t_1$, $t_2$, $t_3$ and $t_4$ denote times, respectively. PWM denotes a PWM control signal which indicates the duty for giving the switching elements $Q_1$-$Q_6$ in the inverter circuit (INV).

When the operation command electric signal (LSW) of about 5 V is given at the time $t_0$, the brushless motor M starts the start-up, and after a predetermined time the brushless motor M reaches the maximum rotation number $N_{max}$, which is commanded by the rotation number command signal (SSET) of about 5 V. The PWM control signal varies the duty from 0% to 100% with a frequency of 2 KHz.

After, the designated sewing work is finished, the operation transfers to the braking operation at the time $t_1$ so as to stop the brushless motor M at a predetermined up position or at a predetermined down position. The braking operation transfers due to the shut-off of the operation command signal (LSW).

At the early time of the braking operation with the deceleration operation of the brushless motor M, the brushless motor M carries out the intermittent regenerating braking operation, and next the brushless motor M carries out the continuous regenerating braking operation at the time $t_2$ of about 50 ms in which the brushless motor M reaches the standard rotation number Ns. The PWM control signal is approximately a 500 μs "on/off" signal. The brushless motor M continues the deceleration operation.

At the time $t_3$ from about 100 ms after the time $t_2$ in which the brushless motor M reaches a predetermined stop ability rotation number (speed), the brushless motor M is rotated at a rotation number such as 200-400 (rpm) in which the duty of the brushless motor M is lowered greatly. In this case, all of the three lower arms comprising switching elements $Q_2$, $Q_4$, $Q_6$ are in an "on" condition (duty 100%).

And when the needle of the sewing machine reaches a predetermined up position or a predetermined down position, the brushless motor M receives a reverse-phase braking and is maintained at such a predetermined position.

During the time of about 100-200 ms from the time $t_3$ to the time $t_4$, a standstill process for the needle is carried out. The PWM control signal varies the duty from 0% to 10%.

Figure 4:
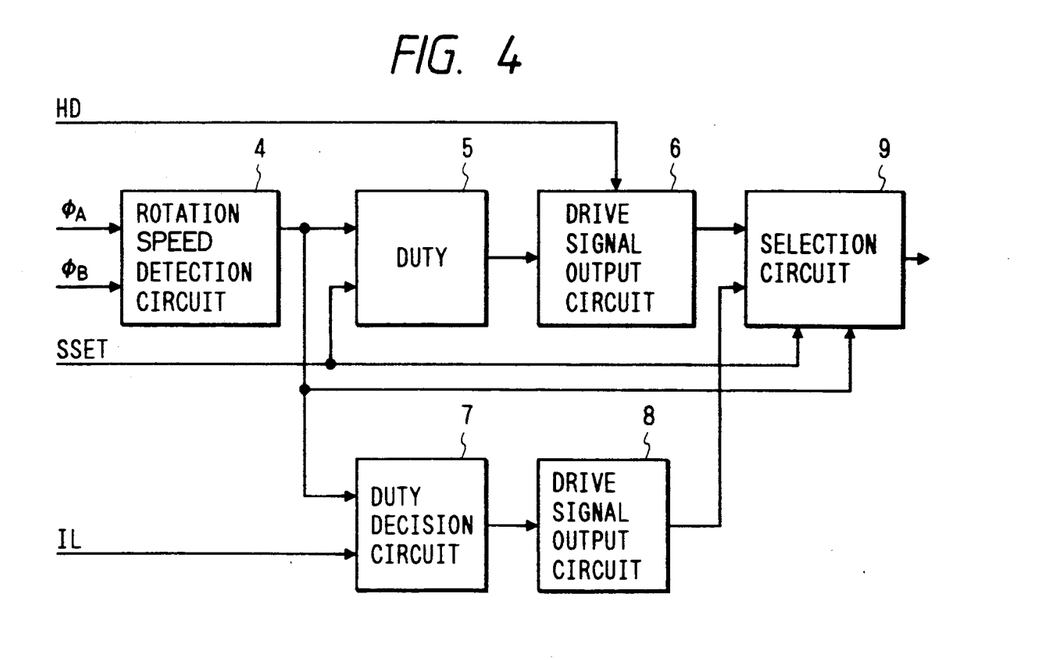
FIG. 4 is an electric block diagram showing another embodiment of a rotation number electric control circuit for use in an industrial sewing machine according to the present invention.

FIG. 4 shows another embodiment of the rotation number electric control circuit for use in the industrial sewing machine. In FIG. 4, the duty of the intermittent regenerating braking current for the brushless motor M is varied.

In FIG. 4, IL denotes a current detection signal detected by the load current detection element $R_1$ in the inverter circuit (INV) and the current detection current 3. The electric block diagram showing the rotation number control circuit 1 shown in FIG. 4 has the current detection signal (IL), which is connected to the duty decision circuit 7, in addition to the electric block diagram showing the rotation number electric control circuit 1 shown in FIG. 1.

This current detection signal (IL) is inputted by the duty decision circuit 7. This current detection signal (IL) shows a value of the regenerating current during the regenerating braking control operation. According to an amplitude of this current detection signal (IL), the duty decision circuit 7 determines whether to carry out the intermittent regenerating braking operation or the continuous regenerating braking operation.

Namely, when the current detection signal (current value) (IL) is large, the duty is made small and the regenerating electric power is reduced, thereby the inverter circuit (INV) can be protected. When the current detection signal (current value) (IL) is small, the regenerating electric power is not reduced much and it is possible to make the control time short.

Further, the duty decision circuit 7 is constituted to make the determination whether to carry out the intermittent regenerating braking operation or the continuous regenerating braking operation in accordance with the amplitude of this current detection signal (current value) (IL).

In this rotation number control structure shown in FIG. 4, the intermittent regenerating braking current is supplied during the early time of the braking operation, and after that the continuous regenerating braking current is supplied.

However, during the early time of the regenerating braking operation, the regenerating braking current is reduced by passing it through a series resistor or a parallel resistor, and after that the large regenerating braking current is supplied without passing it through the above stated resistor. Even in the latter case, it can obtain the same effect described in the above stated embodiment of the present invention.

Namely, other means for the rotation number control circuit may be employed in which, during the early time of the braking operation, the braking energy (effective current) is made small and after that the braking energy (effective current) is made large. For example, such a means is one in which the duty of the intermittent current is raised gradually or the frequency is made variable for attaining this purpose.

We claim:
1. A drive circuit for a motor, comprising:
   motor drive means for driving a brushless multi-phase DC motor, the motor drive means including an inverter circuit including a plurality of switching elements; and
   rotation speed control means for controlling the plurality of switching elements to drive the motor at a rotation speed specified by a rotation speed command in an operating mode, and to regeneratively brake the motor in a braking mode;
   wherein the rotation speed control means controls the plurality of switching elements in the braking mode to regeneratively brake the motor intermittently in an intermittent braking mode during an initial braking period until the motor has decelerated to a predetermined rotation speed, and to regeneratively brake the motor continuously in a continuous braking mode during a subsequent braking period after the motor has decelerated to the predetermined rotation speed.
2. A deceleration apparatus for a motor, comprising:
   motor drive means for driving a brushless multi-phase DC motor, the motor drive means including an inverter circuit including a plurality of switching elements;

rotation speed control means for controlling the plurality of switching elements to drive the motor at a rotation speed specified by a rotation speed command in an operating mode, and to regeneratively brake the motor in a braking mode; and command means for supplying a command indicating one of the operating mode and the braking mode to the rotation speed control means;

wherein the rotation speed control means controls the plurality of switching elements in the braking mode to regeneratively brake the motor intermittently in an intermittent braking mode during an initial braking period until the motor has decelerated to a predetermined rotation speed, and to regeneratively brake the motor continuously in a continuous braking mode during a subsequent braking period after the motor has decelerated to the predetermined rotation speed.

3. A deceleration apparatus for a motor, comprising:

motor drive means for driving a motor, the motor drive means including at least one switching element;

rotation speed control means for controlling the at least one switching element to drive the motor at a rotation speed specified by a rotation speed command in an operating mode, and to regeneratively brake the motor in a braking mode; and command means for supplying a command indicating one of the operating mode and the braking mode to the rotation speed control means;

wherein the rotation speed control means controls the at least one switching element in the braking mode to regeneratively brake the motor intermittently in an intermittent braking mode during an initial braking period until the motor has decelerated to a predetermined rotation speed, and to regeneratively brake the motor continuously in a continuous braking mode during a subsequent braking period after the motor has decelerated to the predetermined rotation speed; and wherein the motor is a multi-phase motor, and wherein the motor drive means includes an inverter circuit including, for each phase of the multi-phase motor, at least one switching element and at least one diode connected to the at least one switching element.

4. A deceleration apparatus according to claim 3, wherein each switching element of the at least one switching element is a transistor.

5. A deceleration apparatus for a motor, comprising:

motor drive means for driving a motor, the motor drive means including at least one switching element;

rotation speed control means for controlling the at least one switching element to drive the motor at a rotation speed specified by a rotation speed command in an operating mode, and to regeneratively brake the motor in a braking mode; and command means for supplying a command indicating one of the operating mode and the braking mode to the rotation speed control means;

wherein the rotation speed control means controls the at least one switching element in the braking mode to regeneratively brake the motor intermittently in an intermittent braking mode during an initial braking period until the motor has decelerated to a predetermined rotation speed, and to regeneratively brake the motor continuously in a continuous braking mode during a subsequent braking period after the motor has decelerated to the predetermined rotation speed; and wherein the rotation speed control means controls the at least one switching element to provide a relatively small amount of deceleration energy to the motor during the intermittent braking mode, and to provide a relatively large amount of deceleration energy to the motor during the continuous braking mode.

6. A deceleration apparatus for a motor, comprising:

motor drive means for driving a brushless multi-phase DC motor, the motor drive means including an inverter circuit including a plurality of switching elements;

rotation speed control means for controlling the plurality of switching elements to drive the motor at a rotation speed specified by a rotation speed command in an operating mode, and to regeneratively brake the motor in a braking mode; and command means for supplying a command indicating one of the operating mode and the braking mode to the rotation speed control means;

wherein the rotation speed control means controls the plurality of switching elements in the braking mode provide a relatively small regenerative braking current to the motor for decelerating the motor during an initial braking period, and to provide a relatively large regenerative braking current to the motor for decelerating the motor during a subsequent braking period.

7. A deceleration apparatus for a motor, comprising:

motor drive means for driving a motor, the motor drive means including at least one switching element;

rotation speed control means for controlling the at least one switching element to drive the motor at a rotation speed specified by a rotation speed command in an operating mode, and to regeneratively brake the motor in a braking mode; and command means for supplying a command indicating one of the operating mode and the braking mode to the rotation speed control means;

wherein the rotation speed control means controls the at least one switching element in the braking mode to provide a relatively small regenerative braking current to the motor through a resistor for decelerating the motor during an initial braking period, and to provide a relatively large regenerative braking current directly to the motor bypassing the resistor for decelerating the motor during a subsequent braking period.

8. A deceleration apparatus for a motor, comprising:

motor drive means for driving a brushless multi-phase DC motor, the motor drive means including an inverter circuit including a plurality of switching elements;

rotation speed control means for controlling the plurality of switching elements to drive the motor at a rotation speed specified by a rotation speed command in an operating mode, and to regeneratively brake the motor in a braking mode; and command means for supplying a command indicating one of the operating mode and the braking mode to the rotation speed control means;

wherein the rotation speed control means includes means for detecting a regenerative braking current produced during the braking mode, and means for controlling the plurality of switching elements in the braking mode to regeneratively brake the motor intermittently in an intermittent braking mode when the detected regenerative braking current is greater than a predetermined regenerative braking current, and to regeneratively brake the motor continuously in a continuous braking mode when the detected regenerative braking current is less than the predetermined regenerative braking current.

9. A drive circuit for a motor, comprising:
motor drive means for driving a motor; and
rotation speed control means for controlling the motor drive means to drive the motor at a rotation speed specified by a rotation speed command in an operating mode, and to regeneratively brake the motor in a braking mode;
wherein the rotation speed control means controls the motor drive means in the braking mode to regeneratively brake the motor intermittently in an intermittent braking mode during an initial braking period until the motor has decelerated to a predetermined rotation speed, and to regeneratively brake the motor continuously in a continuous braking mode during a subsequent braking period after the motor has decelerated to the predetermined rotation speed; and
wherein the motor is a multi-phase motor, and wherein the motor drive means includes an inverter circuit, the inverter circuit including, for each phase of the multi-phase motor, at least one switching element and at least one diode connected to the at least one switching element.

10. A drive circuit according to claim 9, wherein each switching element of the at least one switching element is a transistor.

11. A drive circuit for a motor, comprising:
motor drive means for driving a motor; and
rotation speed control means for controlling the motor drive means to drive the motor at a rotation speed specified by a rotation speed command in an operating mode, and to regeneratively brake the motor in a braking mode;
wherein the rotation speed control means controls the motor drive means in the braking mode to regeneratively brake the motor intermittently in an intermittent braking mode during an initial braking period until the motor has decelerated to a predetermined rotation speed, and to regeneratively brake the motor continuously in a continuous braking mode during a subsequent braking period after the motor has decelerated to the predetermined rotation speed; and
wherein the rotation speed control means controls the motor drive means to provide a relatively small amount of deceleration energy to the motor during the intermittent braking mode, and to provide a relatively large amount of deceleration energy to the motor during the continuous braking mode.

12. A drive circuit for a motor, comprising:
motor drive means for driving a brushless multi-phase DC motor, the motor drive means including an inverter circuit including a plurality of switching elements; and
rotation speed control means for controlling the plurality of switching elements to drive the motor at a rotation speed specified by a rotation speed command in an operating mode, and to regeneratively brake the motor in a braking mode; and
wherein the rotation speed control means includes means for detecting a regenerative braking current produced during the braking mode, and means for controlling the plurality of switching elements in the braking mode to regeneratively brake the motor intermittently in an intermittent braking mode when the detected regenerative braking current is greater than a predetermined regenerative braking current, and to regeneratively brake the motor continuously in a continuous braking mode when the detected regenerative braking current is less than the predetermined regenerative braking current.

13. A drive circuit for a motor, comprising:
motor drive means for driving a brushless multi-phase DC motor, the motor drive means including an inverter circuit including a plurality of switching elements; and
rotation speed control means for controlling the plurality of switching elements to drive the motor at a rotation speed specified by a rotation speed command in an operating mode, and to regeneratively brake the motor in a braking mode; and
wherein the rotation speed control means controls the plurality of switching elements in the braking mode to provide a relatively small regenerative braking current to the motor for decelerating the motor during an initial braking period, and to provide a relatively large regenerative braking current to the motor for decelerating the motor during a subsequent braking period.

14. A drive circuit for a motor, comprising:
motor drive means for driving a brushless multi-phase DC motor, the motor drive means including an inverter circuit including a plurality of switching elements; and
rotation speed control means for controlling the plurality of switching elements to drive the motor at a rotation speed specified by a rotation speed command in an operating mode, and to regeneratively brake the motor in a braking mode; and
wherein the rotation speed control means controls the plurality of switching elements in the braking mode to provide a relatively small regenerative braking current to the motor through a resistor for decelerating the motor during an initial braking period, and to provide a relatively large regenerative braking current directly to the motor bypassing the resistor for decelerating the motor during a subsequent braking period.

15. In a sewing machine having a brushless multi-phase DC motor, a control apparatus comprising:
motor drive means for driving the motor of the sewing machine, the motor drive means including an inverter circuit including a plurality of switching elements; and
rotation speed control means for controlling the plurality of switching elements to drive the motor at a rotation speed specified by a rotation speed command in an operating mode, and to regeneratively brake the motor in a braking mode; and
wherein the rotation speed control means controls the plurality of switching elements in the braking mode to provide a relatively small regenerative braking current to the motor and to provide a relatively large regenerative braking current to the motor for decelerating the motor during a subsequent braking period.

16. In a sewing machine having a brushless multiphase DC motor, a control apparatus comprising:

motor drive means for driving the motor of the sewing machine, the motor drive means including an inverter circuit including a plurality of switching elements; and rotation speed control means for controlling the plurality of switching elements to drive the motor at a rotation speed specified by a rotation speed command in an operating mode, and to regeneratively brake the motor in a braking mode; and wherein the rotation speed control means controls the plurality of switching elements in the braking mode to provide a relatively small regenerative braking current to the motor through a resistor for decelerating the motor during an initial braking period, and to provide a relatively large regenerative braking current directly to the motor bypassing the resistor for decelerating the motor during a subsequent braking period.

* * * * *